(12) United States Patent
Grisenthwaite et al.

(10) Patent No.: US 9,218,302 B2
(45) Date of Patent: Dec. 22, 2015

(54) PAGE TABLE MANAGEMENT (71) Applicant: ARM LIMITED, Cambridge (GB)

(72) Inventors: Richard Roy Grisenthwaite, Cambridge (GB); Matthew Lucien Evans, Cambridge (GB)

(73) Assignee: ARM Limited, Cambridge (GB)

( * ) Notice: Subject to any disclaimer, the term of this patent is extended or adjusted under 35 U.S.C. 154(b) by 186 days.

(21) Appl. No.: 13/926,140

(22) Filed: Jun. 25, 2013

(65) Prior Publication Data
US 2014/0337585 A1   Nov. 13, 2014

(30) Foreign Application Priority Data
May 13, 2013  (GB) .................................. 1308507.1

(51) Int. Cl.
*G06F 12/14*  (2006.01)
*G06F 12/10*  (2006.01)

(52) U.S. Cl.
CPC ........ *G06F 12/1475* (2013.01); *G06F 12/1009* (2013.01); *G06F 2212/151* (2013.01)

(58) Field of Classification Search
CPC . G06F 12/1009; G06F 12/1475; G06F 12/10; G06F 12/121; G06F 2212/657; G06F 12/145; G06F 12/14; G06F 12/12; G06F 2212/151; G06F 12/1483
See application file for complete search history.

(56) References Cited

U.S. PATENT DOCUMENTS

| | | | |
|---|---|---|---|
| 5,119,336 A | 6/1992 | Itoh | |
| 6,339,816 B1 | 1/2002 | Bausch | |
| 6,854,046 B1 | 2/2005 | Evans et al. | |
| 2004/0268084 A1 | 12/2004 | Longerbeam et al. | |
| 2007/0126756 A1* | 6/2007 | Glasco et al. | 345/620 |
| 2008/0109592 A1* | 5/2008 | Karamcheti et al. | 711/103 |
| 2010/0162038 A1 | 6/2010 | Hulbert et al. | |
| 2012/0072669 A1* | 3/2012 | Nishiguchi et al. | 711/135 |
| 2013/0132690 A1* | 5/2013 | Epstein | 711/159 |
| 2014/0149634 A1* | 5/2014 | Tosatti et al. | 711/6 |

FOREIGN PATENT DOCUMENTS

WO    WO 2011/140673    11/2011

OTHER PUBLICATIONS

International Search Report and Written Opinion of the International Searching Authority mailed Jun. 6, 2014 in PCT/GB2014/050724.
UK Search Report dated Oct. 30, 2013 in GB 1308507.1.

* cited by examiner

Primary Examiner — Hashem Farrokh
(74) Attorney, Agent, or Firm — Nixon & Vanderhye P.C.

(57) ABSTRACT

Page table data for each page within a memory address space includes a write permission flag and a dirty-bit-modifier flag. The write permission flag is initialised to a value indicating that write access is not permitted. When a write access occurs, then the dirty-bit-modifier flag indicates whether or not the action of the write permission flag may be overridden. If the action of the write permission flag may be overridden, then the write access is permitted and the write permission flag is changed to indicate that write access is thereafter permitted. A page for which the write permission flag indicates that writes are permitted is a dirty page.

19 Claims, 4 Drawing Sheets

PAGE TABLE MANAGEMENT

This application claims priority to GB Application No. 1308507.1 filed May 13, 2013, the entire contents of which are incorporated herein by reference.

BACKGROUND OF THE INVENTION

1. Field of the Invention

This invention relates to the field of data processing systems. More particularly, this invention relates to the management of page table data within such data processing systems.

2. Description of the Prior Art

It is known to provide data processing systems with page table data for managing regions of memory. For example, such page table data may specify mappings between virtual addresses and physical addresses, access permissions to pages of data and other properties of the pages of data, such as whether or not they may be cached. It is known to include dirty bit information within the page table data to indicate that a page of data has been modified since it was copied into the working memory, for example from a non-volatile storage such as a hard disk drive. Such dirty bit information is useful as when a page of data is being removed from the working memory and back to the non-volatile storage, if the dirty bit for that page indicates that it has not been modified, then there is no need to copy that page of data back to the non-volatile storage. Furthermore, such dirty bit information may be used to identify likely candidates to be paged out (copy back from the working memory to the non-volatile storage) when it is desired to page in (copy from the non-volatile storage to the working memory) a new page of data.

One way of managing such dirty bit information is to provide memory management unit hardware with the capability of updating dirty bit information associated with the pages of memory when a first write access is made to a memory address within that page of memory. Such hardware based updating of dirty bit information within the page table data has the advantage of speed, but it does increase the complexity of the hardware.

Another approach to the management of the dirty status of pages of memory within the memory address space is to use software based management. In this technique each new page which is paged in is marked as read only. If a write is attempted to this page, then a software exception is generated. The software exception handling program can then determine whether or not the page is permitted to be written. If writing is allowed, then the status of the page is changed to write permitted and the page is marked as dirty. If writing is not allowed to that page, then the write permission failure exception is further processed in a normal way. Such software based management techniques serve to trap a first write to a page of data and mark the page as dirty. Thereafter, the page is marked to permit writes without generating an exception and so further write operations will not be slowed. A problem with this approach is that the processing circuitry which generates the write that triggers the exception would normally need to have the capability of executing the software exception handling requirements. Processing circuitry which did not have this capability to itself handle the execution of the exception handling code could trigger an interrupt to a different processing circuitry which would then perform the exception handling on its behalf. However, this approach is slow.

A further problem with the prior art is that it is not possible to mix the hardware base management of the dirty status with the software base management of the dirty status within a system sharing the same page table data, e.g. a shared virtual memory system. The hardware based approach relies upon a page being properly marked as write permitted from the outset with a hardware based update to dirty status being made upon a first write to that page. In contrast, the software based approach relies upon the page being marked as write not permitted when it is first placed in the working memory, with this status being used to trigger an exception and a change to the page being marked as write permitted and the dirty status being set upon a first access to that page. The use of the page table data is thus incompatible between these two approaches.

SUMMARY OF THE INVENTION

Viewed from one aspect the present invention provides an apparatus for processing data comprising:

processing circuitry configured to manage page table data, said page table data specifying access management parameters associated with pages of memory within a memory address space; wherein for each page of memory, said access management parameters include:

a write permission flag indicating whether or not write access is permitted to said page; and a dirty-bit-modifier flag indicating whether or not, if said write permission flag indicates write access is not permitted to said page, then action of said write permission flag is permitted to be overridden to permit a write access to said page and changing of said write permission flag to indicate write access is permitted to said page.

The present technique recognises the desirability of being able to support heterogeneous systems employing both software based management of dirty status within shared page table data and hardware based management of dirty status within the shared page table data. In order to support both of these approaches at the same time, the present technique adds a dirty-bit-modifier flag which serves to indicate that should the write permission flag itself indicate that write access is not permitted, then the action of the write permission flag can be overridden so as to permit a write access and then change the write permission flag to indicate that write access is permitted. The dirty-bit-modifier flag thus qualifies a write permission flag and indicates whether or not write permission is truly not permitted or whether it is not permitted for the purpose of trapping the first write access to a page and accordingly to permit software based management of the dirty status of a page.

Memory management units which normally perform hardware based management of the dirty status of a page, namely hardware-updating memory management circuitry, require modification in order to utilise the dirty-bit-modifier flag. More particularly, such hardware-updating memory management circuitry are formed to respond to generation of a write access to a page with a write permission indicating that write access is not permitted by reading the dirty-bit-modifier flag associated with that write permission flag and, if the dirty-bit-modifier flag indicates that the action of the write permission flag may be overridden, then to permit the write access to be performed and to change the write permission flag to indicate write access is permitted as a hardware controlled operation (i.e. not requiring any software execution).

In order to protect the integrity of the page table data, it is desirable that the hardware-updating memory management unit be configured to perform the reading of the page table data containing the dirty-bit-modifier and write permission flags and the writing of the page table data with the changed write permission flag as an atomic operation, i.e. the two actions are completed together such that no agent can modify the page table data between the read and the write. Such atomic operation may be forced, for example, by using a read-modified-write operation to update the page table data including the write permission flag and the dirty-bit-modifier flag.

It will be appreciated that the processing circuitry which may be associated with such hardware-updating memory management circuitry could take a wide variety of different forms. Examples of such forms of processing circuitry include a general purpose processor which is configured to perform processing operations under software control and is configured to perform hardware control data management using hardware-updating management circuitry. Other examples include a graphics processing unit and/or a direct memory access unit respectively configured to perform hardware control page table data management.

Other embodiments may utilise instead of or in combination with, the hardware-updating memory management circuitry, one or more instances of software-updating memory management circuitry. Such software-updating memory management circuitry responds to a write access to a page having a write permission flag indicating that write access is not permitted by triggering software managed exception processing in which the software managed exception processing includes changing of the write permission flag. Such software managed exception processing may or may not read the dirty-bit-modifier flag in order to determine whether or not the write permission flag should be changed, as the software may have access to other information which would indicate whether or not the write permission flag should be changed. However, reading of the dirty-bit-modifier flag would be a fast way for the software-updating management circuitry to determine whether or not the write permission flag should be changed and the write permitted. The software-updating memory management circuitry may comprise, at least in part, a general purpose processor executing software which manages the updating of the page table data in respect of modifying the write permission flag and thereby capturing the dirty status of a page.

In some embodiments the processing circuitry which manages the page table data may execute an operating system program that includes the capability of managing the write permission flag and the dirty-bit-modifier flag in accordance with the above described techniques. Such processing circuitry may comprise a general purpose processor configured to perform processing operations under software control, with those processing operations including software controlled page table data management.

As previously mentioned, the present techniques could be employed within systems including one or more instances of hardware-updating memory management circuitry, one or more instances of software-updating memory management circuitry or mixtures of these. There is an advantage in utilising the present techniques even if the systems are not heterogeneous (i.e. a system containing a mixture of hardware-updating memory management circuitry and software-updating memory management circuitry) as it is desirable to have a single design of a circuit block which may be deployed in a variety of different system-on-chip integrated circuits where it may be mixed with other circuit elements with which it is desired to share a virtual memory address space and accordingly share a page table data. Furthermore, in homogeneous systems the technique can improve software compatibility with heterogeneous systems.

Particular benefits of the present technique arise in embodiments which utilise a combination of software-updating memory management circuitry and hardware-updating memory management circuitry both sharing the same page table data. In such embodiments it is often convenient that the processing circuitry which employs software-updating memory management circuitry and accordingly has ability to execute program instructions should be responsible for initialising the page table data within a shared memory as this is generally most conveniently performed as a software task, such as on an initial boot.

The write permission flag can have a variety of different forms and may have additional information combined with its meaning. In some embodiments the write permission flag may indicate a respective one of "read only" access permission to a page or "read and write" access permission to a page.

The present technique may be used in association with a given stage of memory management (translation) using page table data, e.g. the stage utilised by an operating system program and the equivalent hardware based control. The present techniques may be employed within systems utilising multiple stages of page table data, such as systems including both hypervisor page table data for managing access by one or more guest operating systems and operating systems page table data for use by those one or more guest operation systems.

In the context of systems using hypervisor page table data, the hypervisor page table data may include a hypervisor write permission flag which serves to indicate whether or not it is permitted to write to a page independently of whether or not read access is permitted to a page. In the context of a hypervisor, there are circumstances where it might be appropriate to give write access to a page, but not to give read access to that page.

As previously discussed, the page table data may serve to provide various other information concerning the page of data being managed. In some embodiments this page table data may specify for a page a mapping between a virtual address of the page within a virtual memory address space and a physical address of the page within a physical address page. This is useful in supporting memory circuitry, as shared virtually-addressed memory.

Viewed from another aspect the present invention provides an apparatus for processing data comprising:
processing means for managing page table data, said page table data specifying access management parameters associated with pages of memory within a memory address space; wherein
for each page of memory, said access management parameters include:
a write permission flag indicating whether or not write access is permitted to said page; and
a dirty-bit-modifier flag indicating whether or not, if said write permission flag indicates write access is not permitted to said page, then action of said write permission flag is permitted to be overridden to permit a write access to said page and changing of said write permission flag to indicate write access is permitted to said page.

Viewed from a further aspect the present invention provides a method of processing data comprising the steps of:
managing access to pages of memory within a memory address space using page table data, said page table data specifying access management parameters associated with said pages; wherein
for each page of memory, said access management parameters include:
a write permission flag indicating whether or not write access is permitted to said page; and
a dirty-bit-modifier flag indicating whether or not, if said write permission flag indicates write access is not permitted to said page, then action of said write permission flag is permitted to be overridden to permit a write access to said page and changing of said write permission flag to indicate write access is permitted to said page.

The above, and other objects, features and advantages of this invention will be apparent from the following detailed description of illustrative embodiments which is to be read in connection with the accompanying drawings.

DESCRIPTION OF THE EMBODIMENTS

Figure 1:
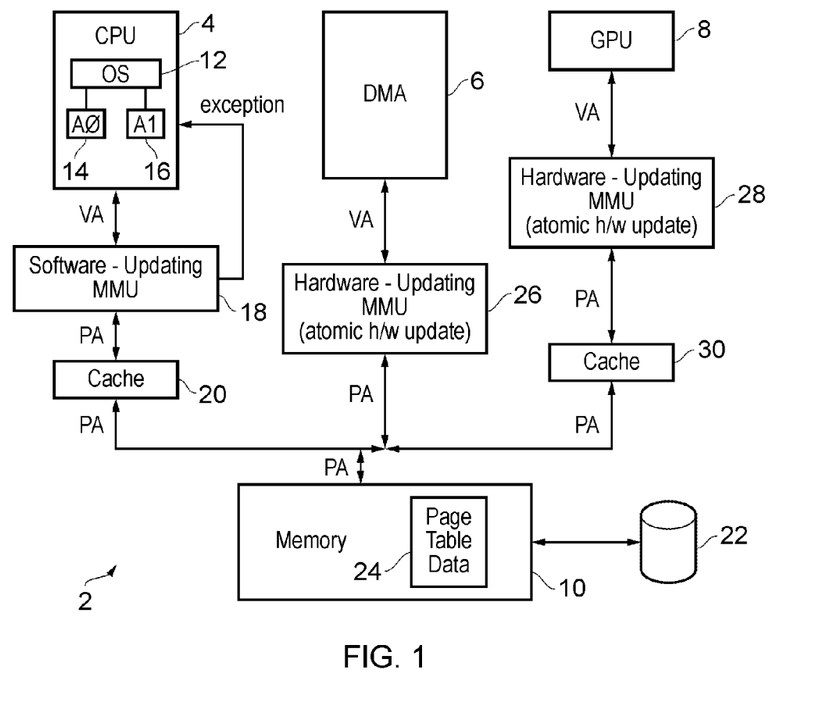
FIG. 1 schematically illustrates a data processing system including multiple instances of processing circuitry sharing a virtual memory address space with shared page table data.

FIG. 1 schematically illustrates a data processing system 2 including multiple instances of processing circuitry comprising a general purpose processor 4, a direct memory access unit 6 and a graphics processing unit 8. The general purpose processor 4, the direct memory access unit 6 and a graphics processing unit 8 share a working memory 10 which is virtually addressed using shared page table data 24, by each of the general purpose processing 4, the direct memory access unit 6 and the graphics processing unit 8 respectively.

The general purpose processor 4 executes software program instructions to run an operating system 12 which manages access to pages of the memory address space on behalf of application programs 14, 16. The general purpose processor 4 generates virtual addresses within a virtual memory address space that are supplied to software-updating memory management circuitry 18. The software-updating memory management circuitry 18 performs virtual-to-physical address translation as well as checking permissions in relation to a memory access to be performed. These permissions can include whether or not write access is permitted. The software-updating memory management circuitry 18 generates a physical address within the physical address space of the working memory 10 and passes this to a cache 20. The memory access may be serviced from the cache 20 or may be serviced from the memory 10 in accordance with normal techniques. In working memory 10 may be connected to a non-volatile storage 22, such as a hard disk drive, with pages of data being paged in and paged out of the working memory 10 from the hard disk drive 22. The working memory 10 stores the page table data 24 which is shared by each of the instances of the processing circuitry 4, 6, 8.

The direct memory access unit 6 generates virtual addresses which are translated to physical addresses by hardware-updating memory management circuitry 26. The graphics processing unit 8 generates memory accesses using virtual addresses which are translated to physical addresses by hardware-updating memory management circuitry 28 from where they pass via cache memory 30 to the working memory 10. In response to a write access request, each of the hardware-updating memory management circuitry 26, 28 performs an atomic hardware update operation upon a write permission flag and a dirty-bit-modifier flag as will be discussed below. Such an atomic operation is one in which the different parts of the operation are not divisible, e.g. they are either all performed or they are all not performed such that the reading of the page table data containing the dirty-bit-modifier and write permission flags and the writing of the page table data with the changed write permission flag are performed as an atomic operation, i.e. the two actions are completed together such that no agent can modify the page table data between the read and the write. An example implementation of such an atomic operation could use a read-modify-write operation. The hardware-updating memory management circuitry 26, 28 reads the write permission flag and the dirty-bit-modifier flag, modifies the write permission flag and then writes the write permission flag back to the page table data 24. These processes should be handled atomically to avoid the possibility of the page table data changing between the read and the write.

The software-updating memory management circuitry 18, when a write accesses is to be performed, reads the write permission flag for the page of data concerned. The page table data containing this write permission flag may be read from the working memory 10 or may be cached within the software-updating memory management circuitry 18 (such as within a translation look aside buffer). If the write permission flag indicates that write access is not permitted, then the software-updating memory management circuitry 18 generates a software exception which triggers the general purpose processor 4 to perform software managed exception processing. If the software managed exception processing determines that the write access is one that should be properly made, i.e. that the write permission flag had been set to indicate that write access was not permitted for the purpose of trapping the first write access and so setting dirty status, then the software managed exception processing atomically changes the write permission flag to indicate that write access is thereafter permitted and allows the write access concerned to proceed. If the write access requested is one that genuinely should not proceed, then normal exception processing responses to such a situation are followed. The operating system 12 may handle such exception processing. The software managed exception processing may utilise the dirty-bit-modifier flag to determine whether or not the action of the write permission flag may be overridden to permit the write access to proceed and to trigger the changing of the write permission flag. Alternatively, the software managed exception processing may determine whether or not the write permission flag can be overwritten using other data or mechanisms. The dirty-bit-modifier flag provides rapid access to such an indication if desired.

The hardware-updating memory management circuitry 26, 28 responds to generation of a write access by a respective one of the direct memory access units 6 and the graphics processing unit 8 by reading the dirty-bit-modifier flag associated with the write permission flag of the page of data to which a write access is being sought. If the write permission flag indicates that write access is not permitted, then the value read for the dirty-bit-modifier flag indicates whether or not the action of that write permission flag may be overridden. If the action of the write permission flag is to be overridden, then the write access is permitted and the hardware-updating memory management circuitry 26, 28 changes the write permission flag to indicate that in future write accesses to that page are permitted. In this way, the dirty-bit-modifier flag serves to indicate to the hardware-updating memory management circuitry 26, 28 whether a write permission flag has been set to indicate that writes are not permitted for the purposes of trapping the first write access to a page, and accordingly noting the dirty status of the page, or is so set because write access is genuinely not to be permitted to that page upon both a first write access attempt and all subsequent write access attempts until the write permission flag is changed.

The use of the write permission flag and the dirty-bit-modifier flag within the page table data permits both software-updating memory management circuitry 18 and hardware-updating memory management circuitry 26, 28 to exist together within the data processing system 2 and share the page table data 4 whilst preserving the ability to track and to note dirty status of pages irrespective of whether the write access occurs via the software-updating memory management circuitry 18 or via the hardware-updating memory management circuitry 26, 28.

Figure 2:
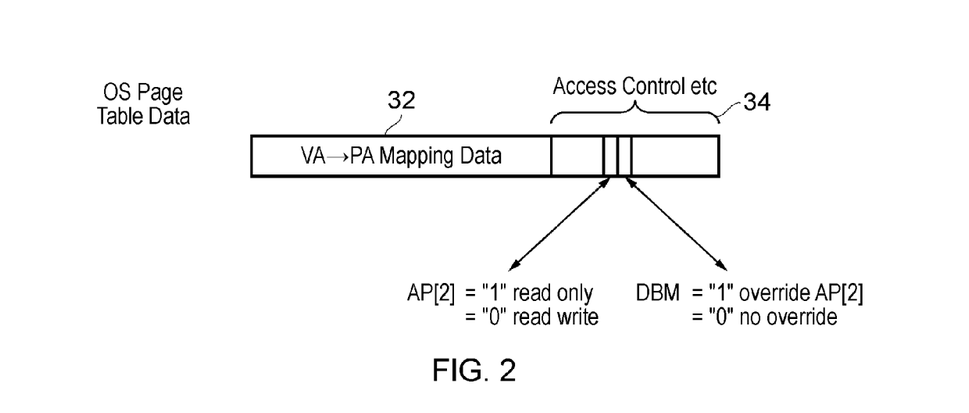
FIG. 2 schematically illustrates a page table data entry.

FIG. 2 schematically illustrates a page table data entry initialised by the operating system 12. This page table data entry includes data such as virtual-to-physical address mapping data 32 and access control data 34. The access control data includes a write permission flag AP[2]. If this write permission flag has a value of "1", then this indicates read only access to the page. If this write permission flag has a value of "0", then this indicates read and write access are permitted to the page.

The access control data 34 also includes a dirty-bit-modifier flag DBM. If the dirty-bit-modifier flag has a value of "1", then this indicates that the action of the write permission flag AP[2] may be overridden and a write access permitted even though the value of the write permission flag AP[2] is "1". If the value of the dirty-bit-modifier flag is "0", then overriding of the action of the write permission flag is not permitted.

Figure 3:
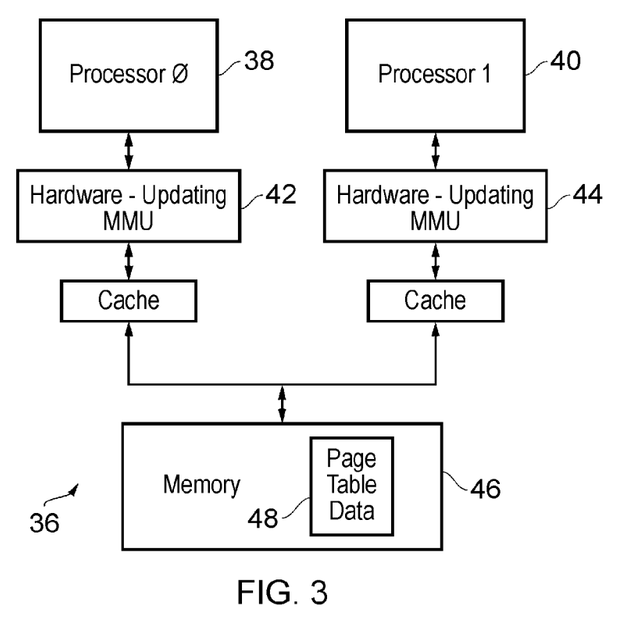
FIG. 3 schematically illustrates a data processing system including multiple instances of hardware-updating memory management circuitry.

FIG. 3 schematically illustrates a data processing system 36 including two general purpose processors 38, 40 each having respective hardware-updating memory management circuitry 42, 44 by which communication is made to a shared memory 46 containing shared page table data 48. In this example embodiment, the page table data 48 for each page of memory includes both the write permission flag and the dirty-bit-modifier flag as previously discussed. Other forms of data processing system which can utilise page table data including both the write permission flag and the dirty-bit-modifier flag include those containing only software-updating memory management circuitry, only hardware-updating memory management circuitry or mixtures of the two.

Figure 4:
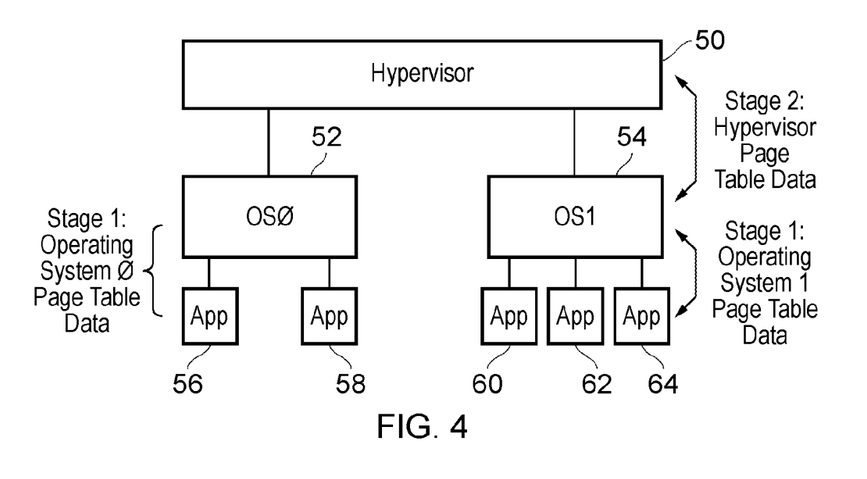
FIG. 4 is a diagram schematically illustrating the relationship between a hypervisor, guest operating systems and application programs in a system employing multiple stages of translation managed by respective page table data.

FIG. 4 schematically illustrates the relationship between a hypervisor 50, two guest operating systems 52, 54 and respective application programs 56, 58, 60, 62, 64. The guest operating systems 52, 54 use operating system page table data to manage access to pages of memory on behalf of their respective application programs 56 to 64. This operating system page table data may include data mapping virtual addresses to physical addresses as well as data controlling access permissions and other characteristics of pages of memory.

Figure 5:
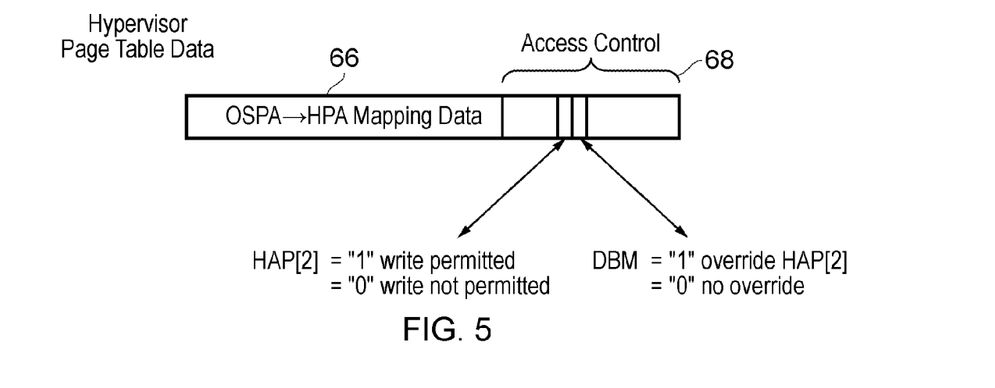
FIG. 5 schematically illustrates an example of hypervisor page table data.

The hypervisor 50 can use hypervisor page table data to manage access to pages of memory for the respective guest operating systems 52, 54. This hypervisor page table data is illustrated in FIG. 5 and may include mapping data 66 from mapping operating system physical addresses to hypervisor physical addresses. Access control data 68 within the hypervisor page table data includes a hypervisor write permission flag HAP[2]. If the hypervisor write permission flag has a value of "1", then this indicates that writes are permitted to the page concerned. If the value of the hypervisor write permission flag of "0", then this indicates that writes are not permitted to the page. The action of the hypervisor write permission flag HAP[2] is independent of whether or not read access is permitted to that page (which may be indicated with a separate flag). The hypervisor page table data also includes a dirty-bit-modifier flag DBM relating to the hypervisor write permission flag. If the dirty-bit-modifier flag has a value of "1", then this indicates that the action of the hypervisor write permission flag may be overridden. Similarly, if the dirty-bit-modifier flag has a value of "0", then this indicates that the action of the hypervisor write permission flag may not be overridden.

Figure 6:
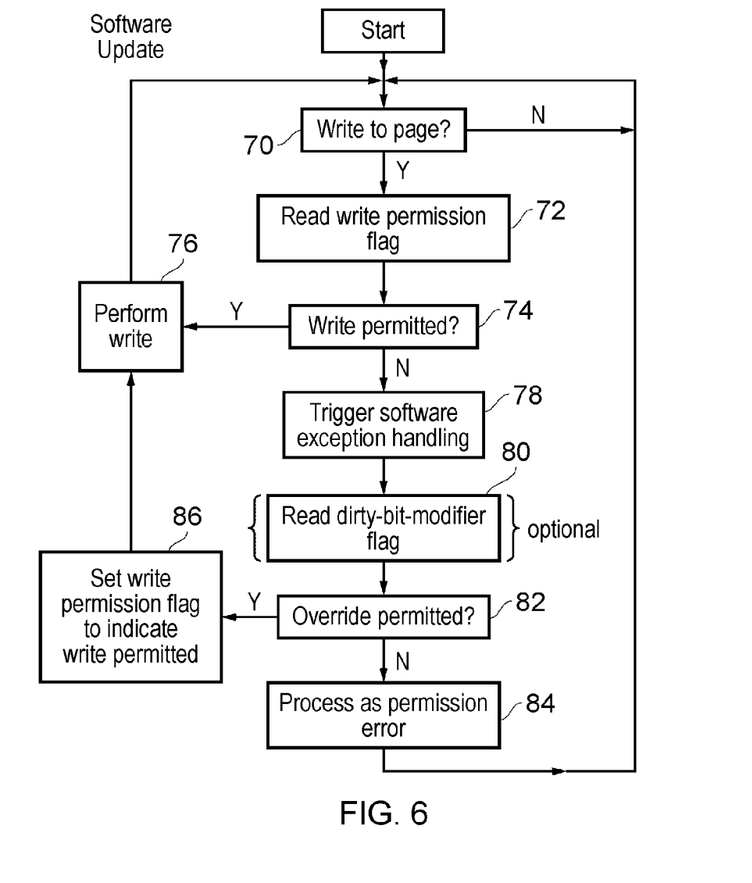
FIG. 6 is a flow diagram schematically illustrating the operation of software-updating memory management circuitry.

FIG. 6 is a flow diagram schematically illustrating the action of software-updating memory management circuitry 18. At step 70 processing waits till a write access to a page is received. Step 72 then reads the write permission flag for the page of data concerned. Step 74 determines whether or not the write permission flag indicates that the write is permitted. If the write permission flag indicates that the write is permitted, then step 76 performs this write and processing is returned to step 70. If the write permission flag indicates that the write is not permitted, then step 78 triggers a software exception and the associated processing circuitry, such as the general purpose processor 4 of FIG. 1, is triggered to perform software exception handling. At step 80, the software exception handling may, optionally, read the dirty-bit-modifier flag associated with the write flag we had at step 72. Step 82 determines whether overriding of the write permission indicated by the write permission flag is permitted. If overriding is not permitted, then step 84 continues processing as a permission error in accordance with standard techniques. If step 82 indicates that overriding is permitted, then step 86 serves to change the write permission flag to indicate that writing is permitted and processing proceeds to step 76 where the write access is performed.

The overall action of the processing of FIG. 6 is that when the page table data is initialised the write permission flags for all pages are set to read only irrespective of whether or not read only access is intended to be continuously in force those pages. When a first write access occurs to a page, the default read only permission that was set triggers the software exception handling of FIG. 6 to be invoked. This software exception handling determines from the dirty-bit-modifier flag (or other data) whether the page of memory concerned is one for which write permission is truly to be blocked or that the write permission flag is set to read only for the purposes of trapping the first write access and so noting the page as dirty (i.e. the page has had at least one write access made to it).

Figure 7:
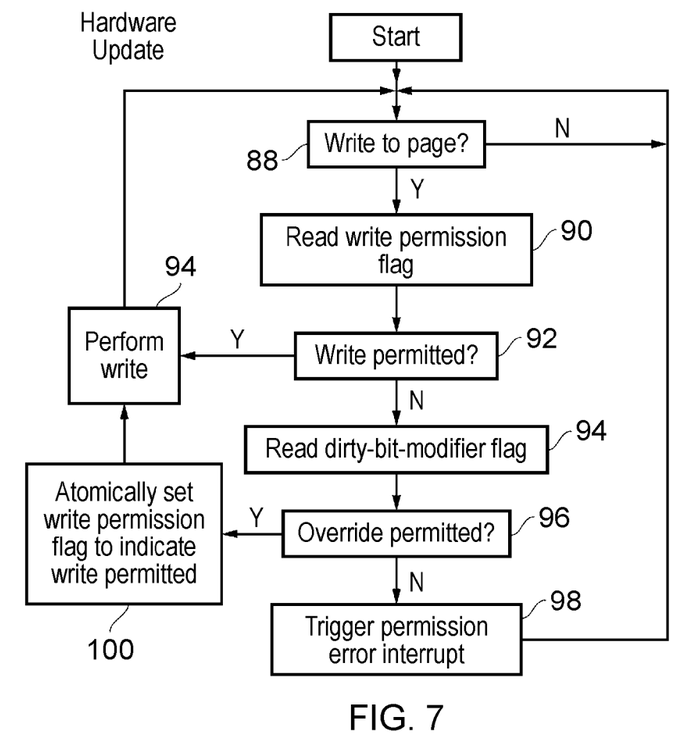
FIG. 7 is a flow diagram schematically illustrating the operation of hardware-updating memory management circuitry.

FIG. 7 is a flow diagram schematically illustrating the action of hardware-update memory management circuitry 26, 28, 42, 44. At step 88 processing waits until a write access to a page is made. At step 90 the write permission flag for that page is read. Step 92 determines whether or not the write permission flag indicates that writes are permitted to that page. If writes are permitted, then step 94 performs the write. If writes are not permitted as indicated by the write permission flag, then step 94 reads the corresponding dirty-bit-modifying flag for the page. Step 96 then determines, in dependence upon the dirty-bit-modifier flag, whether or not overriding of the action of the write permission flag is permitted. If overriding is not permitted, then at step 98 triggers a permission error, such as by triggering an interrupt to a general purpose processor which can handle such a true permission error.

If the determination at step 96 is that overriding the action of the write permission flag is permitted, then step 100 serves to atomically set the write permission flag for that page to indicate that writes are now permitted and then processing is passed to step 94 where the write is performed. The atomic setting of the write permission flag to indicate that writes are permitted is performed in a manner such that it cannot be separately performed from the reading of the dirty-bit-modifier flag 94. The atomic nature of the action of the hardware-updating memory management circuitry may be achieved by using a read-modify-write operation.

Figure 8:
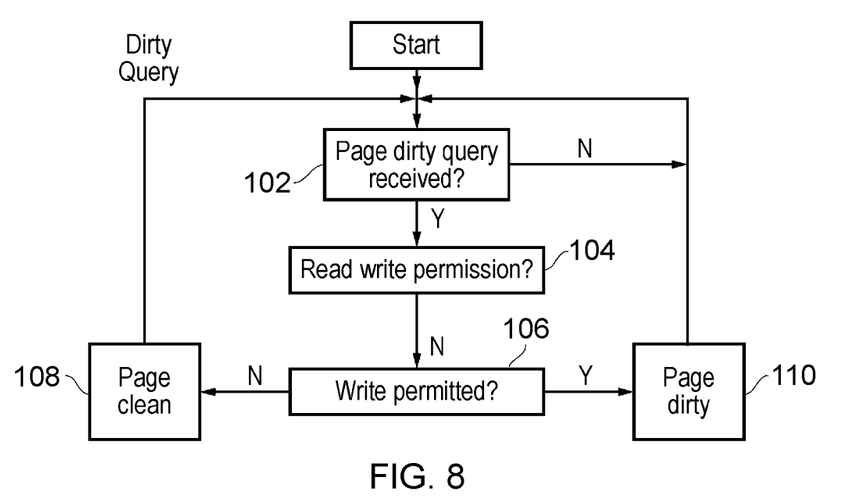
FIG. 8 is a flow diagram schematically illustrating the processing performed when querying whether or not a page is dirty.

FIG. 8 is a flow diagram schematically illustrating how the dirty status of a page may be determined. Step 102 waits until a request to query the dirty status of a page is received. Step 104 then determines the value of the write permission flag for that page. If the write permission flag indicates that the writes are not permitted, as determined at step 106, then step 108 returns an indication that the page is clean. As the write permission flags are as a default initialised to a value indicating that writes are not permitted, then any page for which the write permission flag still indicates that writes are not permitted is one for which no writes can have been made. Whenever a first write is performed to a page, then this causes the write permission flag to be changed from a value indicating that writes are not permitted to a value indicating that writes are permitted. Accordingly, any page for which at least one write has occurred will have a write permission flag indicating that writes are permitted and this is determined at step 106 and reported at step 110.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. Apparatus for processing data comprising:
processing circuitry configured to manage page table data, said page table data specifying access management parameters associated with pages of memory within a memory address space; wherein
for each page of memory, said access management parameters include:
a write permission flag indicating whether or not write access is permitted to said page; and
a dirty-bit-modifier flag indicating whether or not, if said write permission flag indicates write access is not permitted to said page, then action of said write permission flag is permitted to be overridden to permit a write access to said page and changing of said write permission flag to indicate write access is permitted to said page.

2. Apparatus as claimed in claim 1, comprising hardware-updating memory management circuitry coupled to said processing circuitry and configured to respond to generation of a write access by said processing circuitry to a page having an write permission flag indicating that write access is not permitted to said page, by reading said dirty-bit-modifier flag associated with said write permission flag, and, if said dirty-bit-modifier indicates that action of said write permission flag is permitted to be overridden, then permitting said write access and performing said changing of said write permission flag as a hardware controlled operation.

3. Apparatus as claimed in claim 2, wherein said hardware-updating memory management circuitry is configured to perform said reading of said dirty-bit-modifier flag and changing of said write permission flag as an atomic operation.

4. Apparatus as claimed in claim 2, wherein said processing circuitry is configured to perform hardware controlled page table data management.

5. Apparatus as claimed in claims 2, wherein said processing circuitry is one of:
a general purpose processor configured to perform processing operations under software control and to perform hardware controlled page table data management
a graphics processing unit configured to perform hardware controlled page table data management; and
a direct memory access unit configured to perform hardware controlled page table data management.

6. Apparatus as claimed in claim 1, comprising software-updating memory management circuitry coupled to said processing circuitry and configured to respond to generation of a write access by said processing circuitry to a page having an write permission flag indicating that write access is not permitted to said page, by triggering software managed exception processing by said processing circuitry, said software managed exception processing including said changing of said write permission flag.

7. Apparatus as claimed in claim 6, wherein processing circuitry is configured to execute an operating system program that manages said page table data including said write permission flag and said dirty-bit-modifier flag.

8. Apparatus as claimed in claims 6, wherein said processing circuitry is configured to perform software controlled page table data management.

9. Apparatus as claimed in any one claim 6, wherein said processing circuitry comprises a general purpose processor configured to perform processing operations under software control including software controlled page table data management.

10. Apparatus as claimed in claim 1, wherein said processing circuitry comprising first processing circuitry and second processing circuitry and comprising:
software-updating memory management circuitry coupled to said first processing circuitry and configured to respond to generation of a write access by said processing circuitry to a page having an write permission flag indicating that write access is not permitted to said page, by triggering software managed exception processing by said processing circuitry, said software managed exception processing including said changing of said write permission flag; and
hardware-updating memory management circuitry coupled to said second processing circuitry and configured to respond to generation of a write access by said processing circuitry to a page having an write permission flag indicating that write access is not permitted to said page, by reading said dirty-bit-modifier flag associated with said write permission flag, and, if said dirty-bit-modifier indicates that action of said write permission flag is permitted to be overridden, then permitting said write access and performing said changing of said write permission flag as a hardware controlled operation.

11. Apparatus as claimed in claim 10, wherein comprising a shared memory shared by said first processing circuitry and said second processing circuitry and wherein said page table data is stored within said shared memory.

12. Apparatus as claimed in claim 11, wherein said first processing circuitry is configured to initialise said page table data within said shared memory.

13. Apparatus as claimed in claim 1, wherein different values of said write permission flag indicate a respective one of:
read only access permission is permitted to said page; and
read and write access permission is permitted to said page.

14. Apparatus as claimed in claim 1, wherein said page table data includes hypervisor page table data for managing access by one or more operating systems and operating system page table data for each of said one or more operating systems.

15. Apparatus as claimed in claim 14, wherein said hypervisor page table data includes a hypervisor write permission flag and wherein different values of said hypervisor write permission flag indicate a respective one of:
write access is not permitted to said page independently of whether or not read access is permitted to said page; and
write access is permitted to said page independently of whether or not read access is permitted to said page.

16. Apparatus as claimed in claim 1, said page table data specifies for said page a mapping between a virtual address of said page within a virtual memory address space and a physical address of said page within a physical address space.

17. Apparatus as claimed in claim 16, comprising a memory circuitry serving as a shared virtually-addressed memory.

18. Apparatus for processing data comprising:
processing means for managing page table data, said page table data specifying access management parameters associated with pages of memory within a memory address space; wherein
for each page of memory, said access management parameters include:
a write permission flag indicating whether or not write access is permitted to said page; and
a dirty-bit-modifier flag indicating whether or not, if said write permission flag indicates write access is not permitted to said page, then action of said write permission flag is permitted to be overridden to permit a write access to said page and changing of said write permission flag to indicate write access is permitted to said page.

19. A method of processing data comprising the steps of:
managing access to pages of memory within a memory address space using page table data, said page table data specifying access management parameters associated with said pages; wherein
for each page of memory, said access management parameters include:
a write permission flag indicating whether or not write access is permitted to said page; and
a dirty-bit-modifier flag indicating whether or not, if said write permission flag indicates write access is not permitted to said page, then action of said write permission flag is permitted to be overridden to permit a write access to said page and changing of said write permission flag to indicate write access is permitted to said page.

* * * * *